May 2, 1950 K. W. GOODSON ET AL 2,506,210
UNIFORM BLADE LIFT SYSTEM FOR ROTORS
Filed Oct. 3, 1945 4 Sheets-Sheet 1
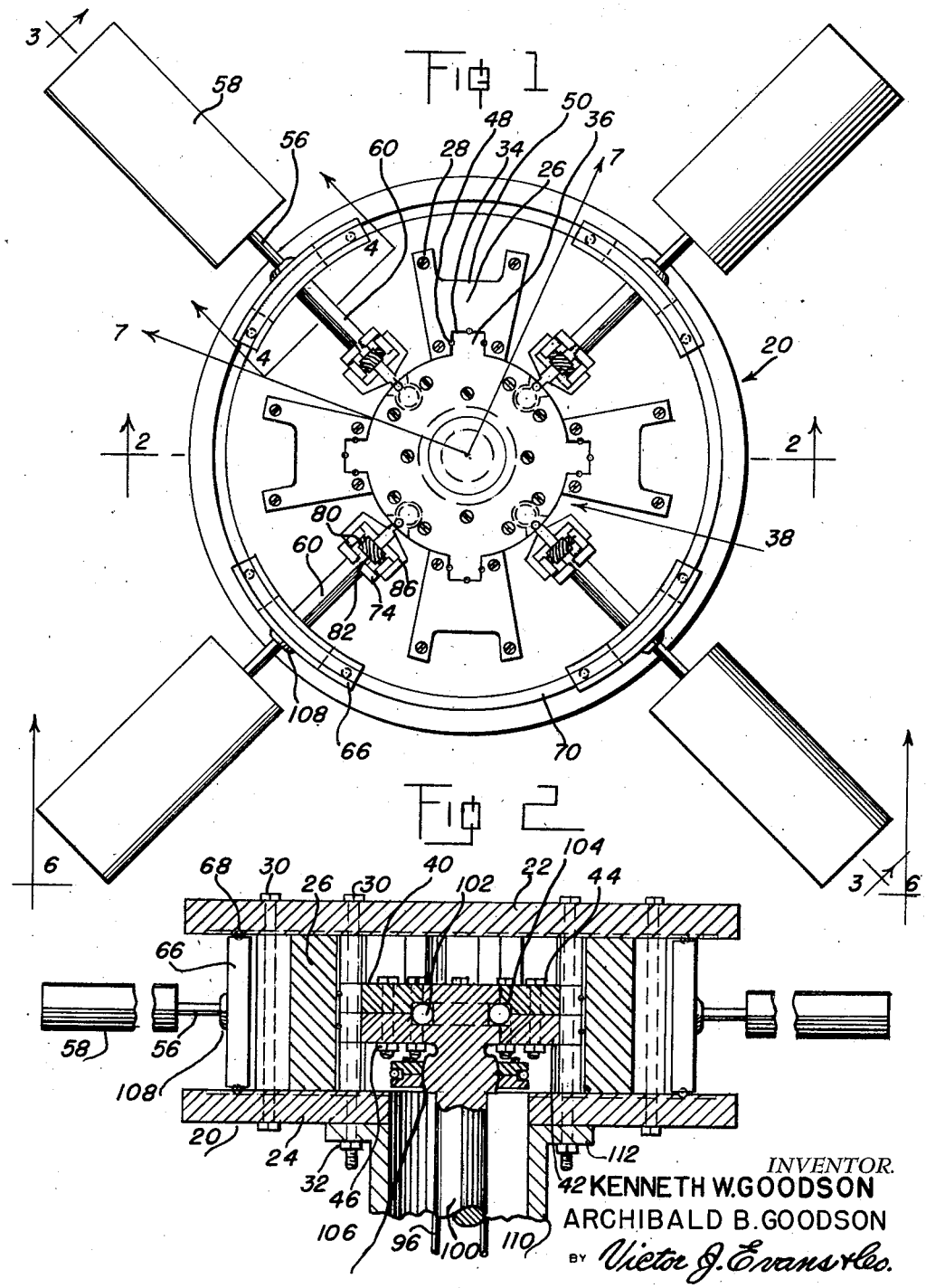
INVENTOR.
KENNETH W. GOODSON
ARCHIBALD B. GOODSON
BY Victor J. Evans & Co.
ATTORNEYS

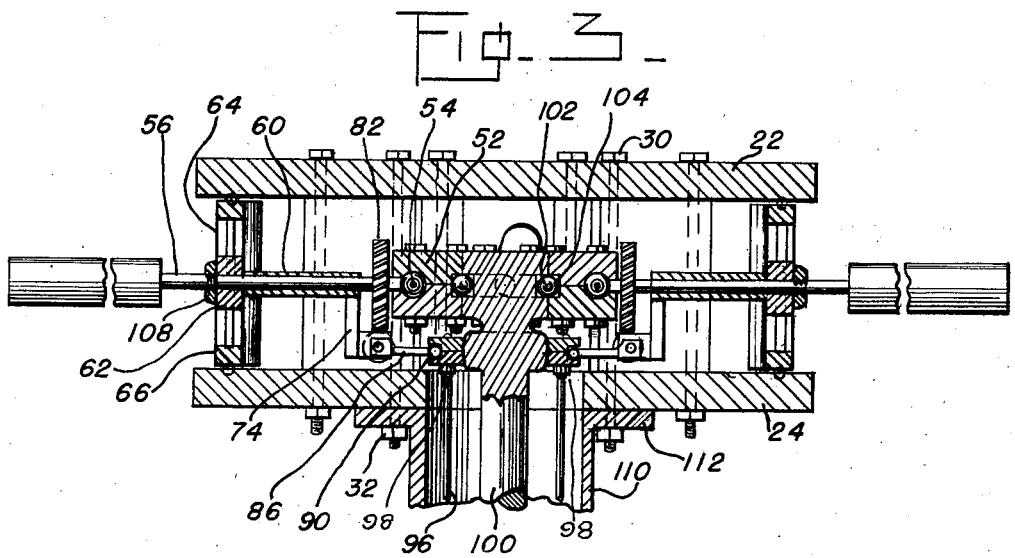
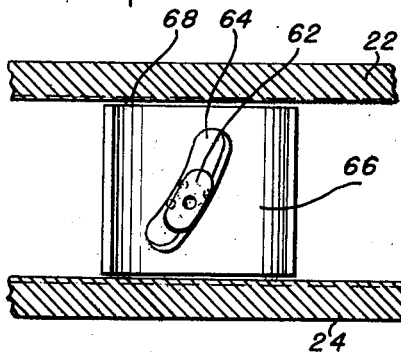
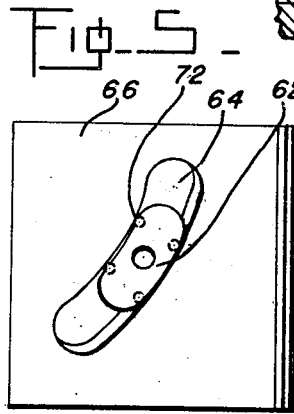

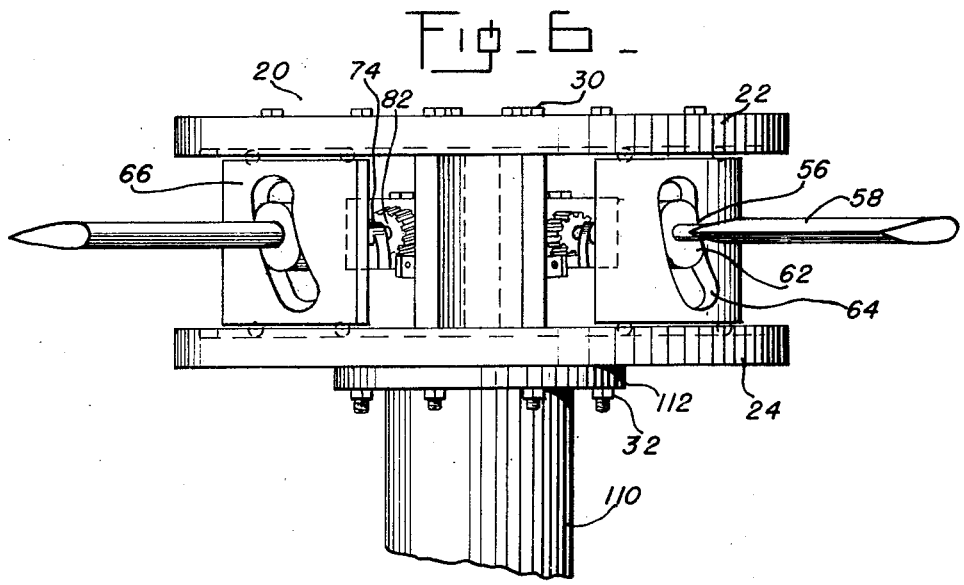
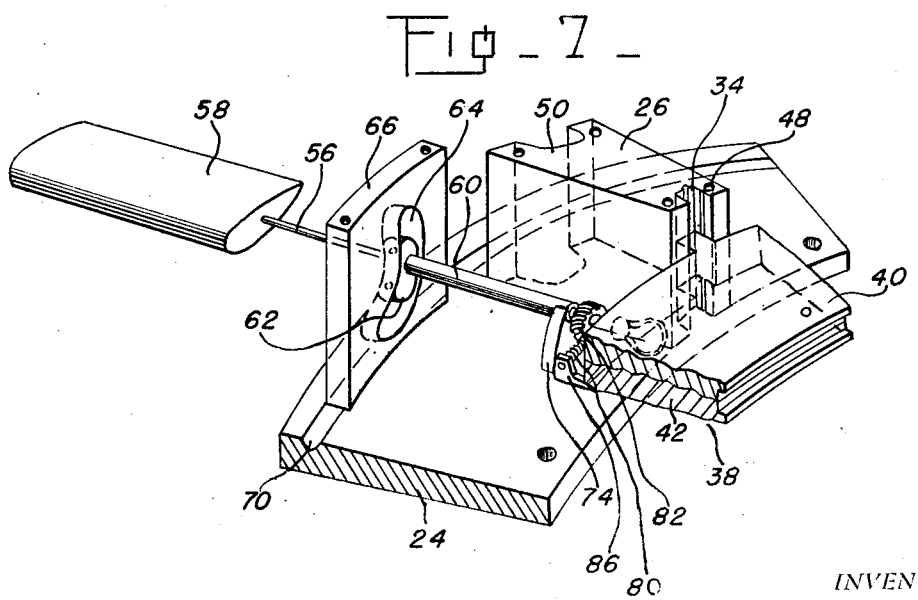

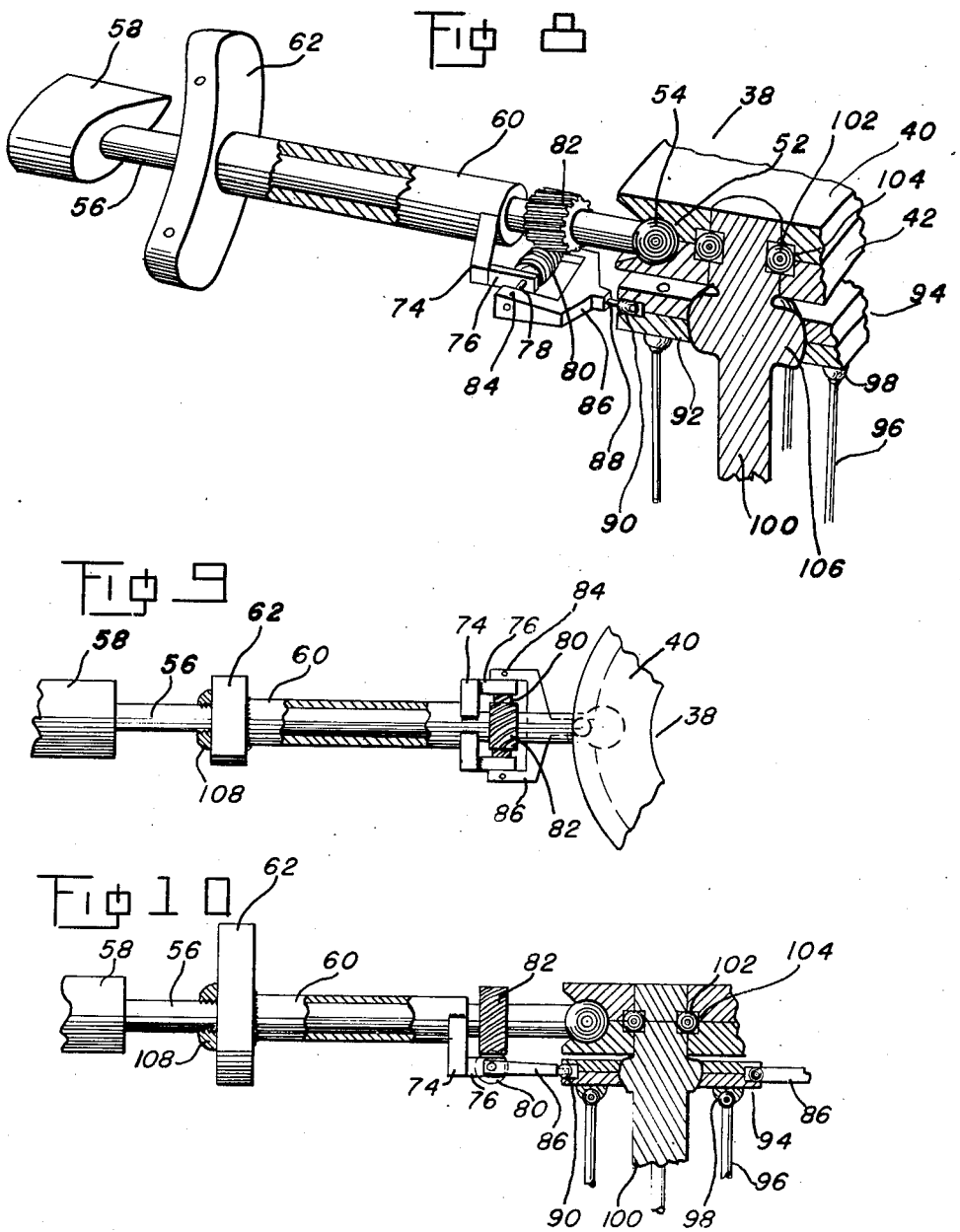

Patented May 2, 1950

2,506,210

UNITED STATES PATENT OFFICE 2,506,210

UNIFORM BLADE LIFT SYSTEM FOR ROTORS

Kenneth W. Goodson, Hampton, Va., and Archibald B. Goodson, Goldsboro, N. C.

Application October 3, 1945, Serial No. 620,100

5 Claims. (Cl. 170—160.25)

This invention relates to a uniform blade lift system for rotors that can be applied to helicopters, gyroplanes or any other type of rotor aircraft.

The main object of the invention is to provide a rotor system that will be stable in any condition and will eliminate any tendency for the aircraft to overturn due to greater lifting force on one side of the rotor system than on the other side.

When such a condition exists, there is a moment force about the plane of rotation that tends to overturn the craft in the direction of the moment force.

In the system hereinafter described, each blade of the system, the number of which will vary, has a uniform lift throughout its path of rotation when the tilt control is in neutral or at zero degrees of tilt. The blades are tilted about their longitudinal axes. This uniformity of lift causes only a negligible or very small moment force about the plane of rotation; therefore, with each blade lifting practically the same amount as any other blade of the system, the resultant lift force of the rotor system will act through the center of the rotor system and perpendicular to the plane of rotation. The rotor in a hovering flight will have only a vertical lift force, since the plane of rotation is horizontal and, therefore, there will be no overturning moment force. When the rotor is tilted with respect to the vertical plane, the lift force component in a vertical direction and a force component in the direction in which the rotor is tilted will make up the force system.

The drag or torque force of the rotor system will have a moment force in the plane of rotation. This force can be neutralized by producing a moment or torque in the opposite direction by the use of a vertical propeller through a moment arm or by having two rotors turning in opposite directions.

The uniform lift system described here can have as many blades in the rotor system as may be conveniently placed in the main structure.

The invention consists of the novel details of construction, arrangement and combination of parts more fully hereinafter described, claimed and illustrated in the accompanying drawings in which:

Figure 1 is a plan view of an embodiment of the invention with the cover plate removed;

Figure 2 is a sectional view on the line 2—2 of Figure 1;

Figure 3 is a sectional view on the line 3—3 of Figure 1;

Figure 4 is a sectional view on the line 4—4 of Figure 1;

Figure 5 is a view looking in the opposite direction to that shown in Figure 4;

Figure 6 is a side view looking in the direction of the arrows on the line 6—6 of Figure 1;

Figure 7 is a sectional view on the line 7—7 of Figure 1;

Figure 8 is a perspective view of the tilt control and blade lift system;

Figure 9 is a plan view thereof, and

Figure 10 is a side view partly in section and partly broken away.

Referring more in detail to the drawings, the numeral 20 designates the main structure of the system which comprises the upper circular cover plate 22 and the lower circular plate 24.

The lower plate 24 has a plurality of diametrically opposed H-shaped members 26 formed integral therewith having bolt holes 28 formed therein through which bolts 30 pass to secure the plate 22 in position and nuts 32 on the bolts 30 hold these elements in fixed relation to each other.

The forward open ended guide recesses or slots 34 of the members 26 are adapted to receive the complementary projecting ears 36 of the pitch change device or blade retainer 38, which comprises an upper section or plate 40 and a lower section or plate 42 and bolts 44 having nuts 46 on the end thereof secure these sections as a unit assembly. Since the member 38 is subjected to upward and downward movement, grooves 48 are provided in the sides and end of the slots 34 to receive ball bearings which create friction free movement of the member 38, and the cut out portions 50 of the member 26 are provided to reduce the weight of the main structure 20.

The sections 40 and 42 are provided with ball sockets or joints 52 which are adapted to receive the spherical bearings 54 on the end of the blade arm 56 on which the blade 58 is mounted, thus the blade 58 is connected direct to the pitch change device or blade retainer 38.

The torque tube or sleeve 60 freely mounted on the blade arm 56 is welded at one end to the concavo-convex actuator slide 62 which is slidably mounted in the complementary shaped elongated actuator slot 64 in the uniform lift plate 66 which is mounted for freedom of movement by means of balls 68 traveling in circular grooves 70 adjacent the outer peripheries of the plates 22 and 24 respectively, but the plate 66 is not grooved but rides on the balls 68 to prevent bending by the angular changes of the blades, the slot 64 and slide 62 are also provided with ball bearings 72 for freedom of movement.

Formed integral with the opposite end of the sleeve 60 is the worm gear supporting bracket 74 which is provided with arms 76 in which is journaled the shaft 78 of the worm gear 80 which meshes with the gear 82 fixed on the blade arm 56. Fixed to the shaft 78 by pins 84 is the forked arm 86 having the stub shaft 88 on which is rotatably mounted the ball roller 90 which is received in the ball groove or joint 92 formed in the sectional tilt control plate 94 which is tilted by means of a plurality of tilt control rods 96 mounted in ball and socket joints 98 formed on the lower surface of the plate 94, these rods are used to tilt the plate backwards or forwards or sideways.

The up and down movement or pitch variation of the pitch change device 38 is controlled by means of the control shaft 100 which is mounted at the medial point of the member 38 by means of the balls 102 and grooves 104. The shaft 100 is provided with the curved collar or swivel 106 where it passes through the plate 94 which is thereby free to turn or swivel on the shaft 100.

To prevent the gear mechanism from moving outward on the arm 56 due to centrifugal force, a stop 108 is secured to the arm 56 adjacent the slide 62.

A tubular power supply shaft 110 having a flange 112 thereon is secured to the plate 24 by the bolts 30 and the shaft 110 houses the tilt control rods 96 and the shaft 100.

The power supply shaft and its supporting structure is not shown in its entirety since the design thereof will change according to the craft and the manner in which such structure is arranged therein. It is to be understood that the mechanism previously described will be multiplied to provide one such mechanism for each blade used in the system.

During operation of the system, the blade arms 56 and blades 58 can be turned relative to the actuator slides 62 and the torque tubes 60 which are free to rotate about the blade arms or shafts 56 by turning the worm gears 80 which turn the gears 82. The gears 80 can be turned in any desired direction by tilting the tilt control plate 94 in the desired direction which actuates the forked arms 86 by means of the stub shafts 88 and rollers 90 thus changing the tilt of the blades 58 along their longitudinal axes. As previously stated, the plate 94 is tilted by the use of the rods 96 either backward or forward or sideways as desired. This will give motion in the direction in which the rotor and the tilt control plate 94 are tilted. The angle of attack on one side of the rotor is decreased (i. e. the side toward tilt), while that on the opposite side away from the tilt is increased, thus the lift is correspondingly decreased or increased, thus the rotor is tilted in the direction in which it is desired to travel. The change of angle of attack will give proportionate increases and decreases in the lift of the blades at their respective positions and the change of lift force on opposite blades provides a force that in unaccelerated flight will be equal to the drag force on the fuselage landing gear and other parts of the aircraft. Therefore, the angle of tilt will be dependent upon the forward force, the drag force and the force of gravity. Therefore, when the desired forward force or equivalent speed is reached, the tilt control plate can be returned to neutral.

When the entire unit is rotating at a constant speed and the change mechanism at a constant vertical position relative to the axis thereof and the uniform lift plate the forces due to rotation or centrifugal force and the lift caused by or due to aerodynamic forces will have a resultant force along the blades and blade arm.

This is true because the blades will seek a neutral position, since they are free to move in any direction about the ball joint and the tilt of the blades is determined by the tilt control plate and its direction of tilt. Once the desired speed is obtained, the control plate will return to neutral position because centrifugal force and lift both vary as the square of the velocity, as shown by the following force formulas:

Centrifugal force (C. F.) =
$$\text{mass} \times \text{acceleration} = WV^2/GR$$
where
W = weight of blades (lbs.)
G = gravity (ft./sec.$^2$)
R = radius of blade increment (ft.)
V$^2$ = relative velocity squared (ft./sec.)
$$\text{Lift} = C_L PSV^2/2$$
where
$C_L$ = lift coeff.
P = density of air
S = area of blade element (ft.$^2$)
V$^2$ = relative velocity squared In the hovering position, the angle of attack of the blades is constant because the only velocity that the blade has is due to the velocity of rotation (there being no forward, backward, or sidewise velocity component to change the total relative velocity). Under this condition, the uniform lift plate only regulates the main pitch of the rotor system since there will be no increments of pitch change as the blade follows its path of revolution because the velocity is constant at each blade position.

When the rotor is tilted forward, backward, or sidewise, the craft will move in the direction in which the rotor is tilted. On one side of the rotor system, the blade is advancing into the wind (giving it a greater relative wind velocity) while on the other side, the blade is retreating or leaving the wind (giving it a smaller relative wind velocity). Under this varying velocity condition, the lift will vary and it is the purpose of the uniform lift plate to keep the lift as nearly a constant value as is possible for all blade positions since constant value is possible for all blade positions except when the tilt control plate is tilted. When the blades are returned to neutral and the plate likewise after the desired speed is obtained, the constant lift will again be maintained. When the tilt control plate is in neutral position for a forward speed, there is a component of the total rotor lift acting in that direction of travel.

In forward motion, when the blade is advancing into the wind, the lift or lifting force becomes greater because the velocity is greater (see lift formula); but with the centrifugal force being constant at a given speed of rotation, the resultant of C. F. and lift is increased because of the greater lift force due to the increment change in velocity. This increase in lift causes the blade to rise. When the blade rises, it follows the actuator slot in the uniform lift plate because of the actuator slide which is fastened to the blade arm. This action causes the blade to decrease its angle of attack as it is raised, thus causing the lift to decrease. This tends to send the blade back to its original position. There will, however, be a neutral position that will be reached between the original and the new force conditions. This position is constantly changing from the time the blade is advancing into the wind on one side, until it is leaving the wind on the other side. The relative velocity also varies because of the angularity of the blade with the forward velocity of the craft. The uniform lift plate takes care of the variation when the tilt control plate is in a neutral position. The reverse condition takes place with the blade on the side in which the blade is retreating from the wind. The lift is decreased due to a decrease in the relative velocity when the blade is retreating from the wind. This decrease in lift makes the blade lower itself and makes the actuator slide follow the actuator slot in the uniform lift plate. This procedure increases the angle of attack of the blade, thus increasing the lift again. These forces will find a neutral position between these extreme conditions.

The blade velocity increase on one side of the rotor is the same as the blade velocity decrease on the other side. This is true when the aircraft has forward, backward or sidewise movement causing the blade to rotate into and away from the resultant wind velocity. The actuator slot in the uniform lift plate can be designed so that the curve thereof will be such that the lift will increase or decrease in the required amount by causing the angle of attack to change the required amount for the lift desired. The design and shape of the actuator slot will therefore be determined by the type of airfoil used. An airfoil of small center of pressure travel would be most satisfactory to use for the reason of eliminating the pitching or twisting movement of the blade.

The uniform lift plate is free to move back or forth on the ball bearings in the grooved tracks as previously described so that the blade arm will not be subjected to bending stresses which are caused by increases or decreases of drag as the velocity changes. Due to the force system, the resultant force is acting along the blade arm; therefore all the forces are acting through the ball joint.

The drag force formula may be written as follows:

$$\text{Drag} = C_D \rho S V^2 / 2$$

where
$C_D$ = drag coefficient
$\rho/2$ = density of air
$S$ = area of blade element
$V^2$ = blade velocity squared (relative)

Centrifugal force keeps the blade from folding upward in flight. If a greater lift is desired, the pitch device is lowered increasing the angle of attack of the entire rotor system and thus changing the resultant force system which causes the blade to increase its angle of attack through the actuator slide and the uniform lift plate. This increases the total lift of the system. The main pitch of all blades of the rotor system is changed at the same time instead of independently as with the incremental pitch changes due to incremental velocity changes. After the pitch changing device is lowered, the uniform lift plate takes care of the incremental changes of the lift and velocity due to forward, backward or sidewise movement when the pitch tilt control plate is in neutral once this movement or speed has been obtained. The lift can be decreased in a like manner by raising the pitch change device. The forces after the pitch change device has been raised or lowered are regulated in the same manner as before by the uniform lift plate. From this it can be seen that the total pitch of each blade is controlled by the uniform lift plate, the pitch change device and the tilt control plate. By tilting the blades or rotor system forward, backward or sidewise, motion can be obtained in that direction as was in the other conditions described. Tilting is accomplished by changing the angle of the tilt control plate by means of the control rods, the actuating mechanism of which is not shown but may be installed as desired. Constant lift will be maintained in the same manner through the uniform lift plate but at a greater lift than before. In operation, the device as a whole is rotated by means of hollow shaft 110, the direction of rotation being such that the rounded portions of the blade 58 lead. This produces a lifting force upward on the blades and a centrifugal force outward, producing a resultant force upward and outward which tends to lift the device due to the upward force on the blades. As the blades 58 rise, the shaft 56 rises, carrying with it the cam 62 which moves in the slot 64, causes the shaft to turn and change the angle of the blade, which changes the lifting force.

The angle of the blade 58 can also be changed by means of the rods 96 which tilt the plates 92 and 94 which tilt the worm 89, causing the gear 82 to turn to rotate shaft 56 to change the angle of the blade 58, and thus adjust the lifting force.

The preceding description was for constant rotational speed but the uniform lift system will operate just as well for constantly varying rotational speeds since centrifugal force and lift force are proportional because they both are dependent upon the square of the velocity, everything else remaining constant; therefore the resultant force will be in the same direction, no matter what the speed provided the angle of attack of the blade is constant. This system can also be used for combinations of varying speeds of rotation and varying pitch changes, with the incremental lift change being taken care of by the uniform lift plate.

It is believed that the operation of the device and its construction will be apparent to those skilled in the art and it will be seen that a rotor system has been provided that can be applied to rotor conditions of constant rotor speed, varying rotor speed or a combination of both when applied to helicopters, gyroplanes or similar types of rotor craft.

It is also to be understood that modifications and changes may be made in the minor details of construction, combination and arrangement of parts without departing from the spirit of the invention or the scope of the appended claims.

Having thus described the invention, what is claimed as new and desired to be secured by Letters Patent is:

1. In a propeller having blades and a hub, a tubular shaft on which the hub is mounted, a control shaft positioned in the said tubular shaft and having enlarged sections thereon positioned in the hub, said hub including a pair of spaced parallel flanges having circumferential grooves therein, radially disposed blade shafts carried by the hub and on the outer ends of which the blades are mounted, said blade shafts having balls on the inner ends thereof positioned to coact with one of the enlarged sections of the control shaft, plates positioned to travel around the circumferential grooves of the flanges of the hub and through which the said blade shafts extend, means rotating the blade shaft to adjust the pitch of the propeller, and means tilting the blades through the inner ends of the said blades shafts.

2. In a propeller having blades and a hub, a tubular shaft on which the hub is mounted, a control shaft positioned in the said tubular shaft and having enlarged sections thereon positioned in the hub, said hub including a pair of spaced parallel flanges having circumferential grooves therein, radially disposed blade shafts carried by the hub and on the outer ends of which the blades are mounted, said blade shafts having balls on the inner ends thereof positioned to coact with one of the enlarged sections of the control shaft, plates having arcuate slots therein positioned to travel around the circumferential grooves of the flanges of the hub and through which the said blade shafts extend, cams on the blade shafts and positioned in the said arcuate slots, means rotating the blade shafts to adjust the pitch of the propeller, and means actuating the cams in the said arcuate slots for tilting the blades through the inner ends of the said blade shafts.

3. In a propeller having blades and a hub, the combination which comprises a tubular shaft on which the hub is mounted, a control shaft extended through the said tubular shaft and having enlarged sections on the end extended into the hub, said hub including a pair of spaced parallel flanges having aligned circumferential grooves therein, radially disposed blade shafts extending from the hub and on the outer ends of which the blades are mounted, plates having arcuate slots therein positioned between the flanges of the hub and mounted to travel around the said circumferential grooves of the flanges, said blade shafts having balls on the inner ends thereof and cams on the intermediate parts thereof positioned in the said arcuate slots of the plates, circular plates rotatably mounted on the said control shaft in which the balls of the blade shafts are carried, means slidably holding the said circular plates between the flanges of the hubs, means actuating the circular plate to adjust the pitch of the blades of the propeller, and means on said control shaft for tilting the blades of the propeller.

4. In a propeller having blades and a hub, the combination which comprises a tubular shaft on which the hub is mounted, a control shaft extended through the said tubular shaft and having enlarged sections on the end extended into the hub, said hub including a pair of spaced parallel flanges having aligned circumferential grooves therein, radially disposed blade shafts extending from the hub and on the outer ends of which the blades are mounted, plates having arcuate slots therein positioned between the flanges of the hub and mounted to travel around the said circumferential grooves of the flanges, said blade shafts having balls on the inner ends thereof and cams on the intermediate parts thereof positioned in the said arcuate slots of the plates, circular plates rotatably mounted on the said control shaft in which the balls of the blade shafts are carried, means slidably holding the said circular plates between the flanges of the hubs, means actuating the circular plates to adjust the pitch of the blades of the propeller, said control shaft having a spherical surface thereon positioned in the hub, a control plate having a spherical socket carried by the spherical surface of the control shaft, and means conveying tilting motion to the blades of the propeller through the said control plate.

5. In a propeller having blades and a hub, the combination which comprises a tubular shaft on which the hub is mounted, a control shaft extended through the said tubular shaft and having enlarged sections on the end extended into the hub, said hub including a pair of spaced parallel flanges having aligned circumferential grooves therein, radially disposed blade shafts extending from the hub and on the outer ends of which the blades are mounted, plates having arcuate slots therein positioned between the flanges of the hub and mounted to travel around the said circumferential grooves of the flanges, said blade shafts having balls on the inner ends thereof and cams on the intermediate parts thereof positioned in the said arcuate slots of the plates, circular plates rotatably mounted on the said control shaft in which the balls of the blade shafts are carried, means slidably holding the said circular plates between the flanges of the hubs, means actuating the circular plates to adjust the pitch of the blades of the propeller, said control shaft having a spherical surface thereon positioned in the hub, a control plate having a spherical socket carried by the spherical surface of the control shaft, worm gears on the said blade shafts, and worms meshing with the said worm gears and actuated by the said control plate to impart tilting motion to the blades of the propeller.

KENNETH W. GOODSON.
ARCHIBALD B. GOODSON.

REFERENCES CITED

The following references are of record in the file of this patent:

UNITED STATES PATENTS

| Number | Name | Date |
| --- | --- | --- |
| 1,870,928 | Smith | Aug. 9, 1932 |
| 2,030,578 | Flettner | Feb. 11, 1936 |
| 2,041,611 | Kotelentseff | May 19, 1936 |
| 2,074,342 | Platt | Mar. 23, 1937 |
| 2,127,105 | Campbell | Aug. 16, 1938 |
| 2,150,129 | Pecker | Mar. 7, 1939 |
| 2,428,200 | Campbell | Sept. 30, 1947 |

FOREIGN PATENTS

| Number | Country | Date |
| --- | --- | --- |
| 18,343 | Great Britain | 1901 |